United States Patent
Wakabayashi et al.

(10) Patent No.: US 10,351,087 B2
(45) Date of Patent: Jul. 16, 2019

(54) PROTECTION CONTROL APPARATUS

(71) Applicants: DENSO CORPORATION, Kariya, Aichi-pref. (JP); NATIONAL UNIVERSITY CORPORATION NAGOYA UNIVERSITY, Nagoya-shi, Aichi-ken (JP)

(72) Inventors: Asei Wakabayashi, Kariya (JP); Takeshi Horiguchi, Kariya (JP); Kazuhisa Hashimoto, Kariya (JP); Koji Mizuno, Nagoya (JP); Daisuke Ito, Nagoya (JP)

(73) Assignees: DENSO CORPORATION, Kariya, Aichi-pref. (JP); NATIONAL UNIVERSITY CORPORATION NAGOYA UNIVERSITY, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/742,395

(22) PCT Filed: Jun. 24, 2016

(86) PCT No.: PCT/JP2016/003045
§ 371 (c)(1),
(2) Date: Jan. 5, 2018

(87) PCT Pub. No.: WO2017/006532
PCT Pub. Date: Jan. 12, 2017

(65) Prior Publication Data
US 2018/0194315 A1    Jul. 12, 2018

Related U.S. Application Data
(63) Continuation of application No. PCT/JP2016/003045, filed on Jun. 24, 2016.

(30) Foreign Application Priority Data

Jul. 9, 2015   (JP) ................. 2015-138054

(51) Int. Cl.
*B60R 21/0134*   (2006.01)
*B60R 21/38*   (2011.01)
(Continued)

(52) U.S. Cl.
CPC ........ *B60R 21/0134* (2013.01); *B60R 19/205* (2013.01); *B60R 21/36* (2013.01);
(Continued)

(58) Field of Classification Search
CPC ... B60R 21/0134; B60R 19/205; B60R 21/36; B60R 21/38; B60R 2300/301; B60R 2021/01013
See application file for complete search history.

(56) References Cited

U.S. PATENT DOCUMENTS

| | | | |
|---|---|---|---|
| 2008/0097699 A1* | 4/2008 | Ono | B60R 21/0134 701/300 |
| 2014/0207341 A1* | 7/2014 | Wanami | B60R 21/0134 701/46 |

FOREIGN PATENT DOCUMENTS

| | | |
|---|---|---|
| JP | 2003-226211 A | 8/2003 |
| JP | 2004-017812 A | 1/2004 |

(Continued)

*Primary Examiner* — Anne M Antonucci
(74) *Attorney, Agent, or Firm* — Knobbe, Martens, Olson & Bear, LLP

(57) ABSTRACT

A second-time collision position estimator section estimates a second-time collision position that is a position at which an occupant on a two-wheel mobile object has a second-time collision, based on a relative vector estimated by a relative vector estimator section and a first-time collision position identified by a first-time collision position identifier section. An operation instructor section operates an external protec- (Continued)

tion device, which is determined to be able to protect the occupant on the two-wheel mobile object based on the second-time collision position estimated by the second-time collision position estimator section.

6 Claims, 5 Drawing Sheets

(51) Int. Cl.
 *B60R 19/20* (2006.01)
 *B60R 21/36* (2011.01)
 *B60R 21/01* (2006.01)
(52) U.S. Cl.
 CPC .... *B60R 21/38* (2013.01); *B60R 2021/01013* (2013.01); *B60R 2300/301* (2013.01)

(56) References Cited

FOREIGN PATENT DOCUMENTS

| | | |
|---|---|---|
| JP | 2011-218857 A | 11/2011 |
| JP | 2012-131463 | 7/2012 |

\* cited by examiner

FIG. 3
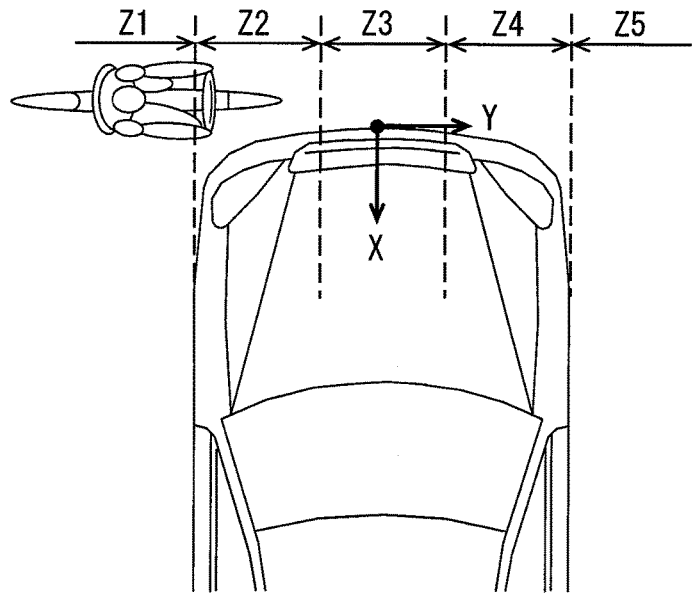
FIG. 4
D1 ESTIMATE DATA
- D11: LEFT SIDE DATA
- D12: LEFT FRONT END DATA
- D13: CENTER DATA
- D14: RIGHT FRONT END DATA
- D15: RIGHT SIDE DATA
- D111: HEAD PART DATA
- D112: CHEST PART DATA
FIG. 5
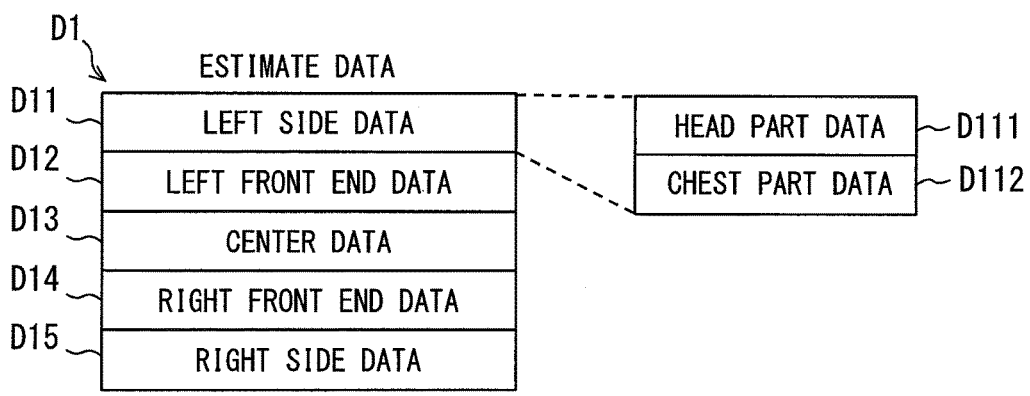
|  |  | Y AXIS DIRECTION SPEED [km/h] | | | |
| --- | --- | --- | --- | --- | --- |
|  |  | 0-5 | 5-15 | 15-25 | 25-35 |
| X AXIS DIRECTION SPEED [km/h] | 15-25 | – | RIGHT A PILLAR | COWLING TOP | WS |
|  | 25-35 | – | * | WS | WS |
|  | 35-45 | – | * | WS | WS |
|  | 45-55 | – | * | WS | WS |
|  | 55-65 | – | – | WS | WS |

PROTECTION CONTROL APPARATUS

CROSS REFERENCE TO RELATED APPLICATION

The present application is based on Japanese Patent Application No. 2015-438054 filed on Jul. 9, 2015, the disclosure of which is incorporated herein by reference.

TECHNICAL FIELD

The present disclosure relates to a protection control apparatus which controls an operation of a protection device for protecting a human being who collides with a vehicle.

BACKGROUND ART

Suppose a case where a pedestrian has a collision (defined as a first-time collision) with a front end part of a vehicle such as a front bumper. In such a case, the pedestrian may fall onto the vehicle so that a head part or a chest part of the pedestrian has a collision (defined as a second-time collision) with the body of the vehicle.

A technology for reducing a damage of a pedestrian having such a second-time collision is known as a system that operates a protection device such as an air bag inflated towards a predetermined range outside of the vehicle in response to the detection of a first-time collision with a pedestrian (for instance, Patent literature 1). Such a system can reduce an impact enforced to the pedestrian due to the second-time collision.

Protection devices, which protect a pedestrian from a second-time collision, include a pop-up hood apparatus that raises the back of the hood, in addition to air bags inflated in various regions such as the windshield, the pillar part, and the cowling top.

PRIOR ART LITERATURES

Patent Literature

Patent literature 1: JP 2001-017812 A

SUMMARY OF INVENTION

Suppose a case where a first-time collision occurs between a vehicle and a two-wheel vehicle (defined as a two-wheel mobile object) such a bicycle which an occupant rides. Such a case has a risk that causes the occupant on the bicycle to fall onto the vehicle to involve a second-time collision with the body of the vehicle. That is, such an occupant on the two-wheel mobile object (defined as a two-wheel vehicle occupant) is also desired to be a target for protecting at a collision with a vehicle; thus, when the collision with the two-wheel mobile object is detected, the vehicle is desired to operate the protection devices.

However, at a first-time collision with a vehicle, an occupant on the two-wheel vehicle exhibits a behavior different from that of a pedestrian from the following reasons. Suppose a case where a mobile object (defined as a collision object) with which a vehicle has a first-time collision is a two-wheel mobile object. In such a case, the two-wheel vehicle and its occupant are separate from each other; the center of gravity of the occupant on the two-wheel mobile object is higher than that of the pedestrian; and the movement speed of the two-wheel mobile object is greater than that of the pedestrian.

As a result, when a collision object is a two-wheel mobile object, the two-wheel vehicle occupant may not fall on a region to which the protection device of the vehicle corresponds. Further, operating a protection device may be wasteful if such a protection device corresponds to a region onto which the two-wheel vehicle occupant does not fall. Assume a case that a vehicle is equipped with a plurality of protection devices having mutually different corresponding regions located on outer surfaces of the vehicle. In such a case, it is preferable that operating a protection device corresponding to a region where the two-wheel vehicle occupant has a risk of a second-time collision whereas not operating any protection device corresponding to a region where the two-wheel vehicle occupant has no risk of a second-time collision.

The present disclosure is achieved under the above situation. It is an object of the present disclosure to provide a protection control apparatus that is capable of suppressing a useless operation of a protection device in respect of protecting an occupant on a two-wheel mobile object in a case where a first-time collision occurs between a vehicle and the two-wheel mobile object.

To achieve the above object, according to an aspect of the present disclosure, a protection control apparatus is provided to be used in a vehicle equipped with at least one external protection device to protect an occupant on a two-wheel vehicle. The protection control apparatus is provided to include an object recognizer section, a first-time collision detector section, a relative vector estimator section, a first-time collision position identifier, a second-time collision position estimator section, an operation instructor section, and an operation device selector section. The object recognizer section acquires information about an object that is present in a predetermined detection area around the vehicle. The first-time collision detector section detects an occurrence of a first-time collision between the vehicle and a two-wheel mobile object that is a two-wheel vehicle on which an occupant is present based on the information acquired by the object recognizer section. The relative vector estimator section estimates a movement vector of a two-wheel mobile object having a first-time collision with the vehicle, the movement vector being relative to the vehicle at a first-time collision time, based on the information acquired by the object recognizer section. The first-time collision position identifier acquires a first-time collision position that is a collision position of the two-wheel mobile object relative to the vehicle at the first-time collision time when the first-time collision occurs between the vehicle and the two-wheel mobile object. The second-time collision position estimator section estimates a second-time collision position that is a position at which the occupant on the two-wheel mobile object has a second-time collision, based on the relative vector estimated by the relative vector estimator section and the first-time collision position acquired by the first-time collision position identifier section. The operation instructor section operates the external protection device. The operation device selector section selects, as an external protection device that is intended to be operated, the external protection device corresponding to the second-time collision position estimated by the second-time collision position estimator section. The operation instructor section operates the external protection device selected by the operation device selector section.

Under the above configuration, the second-time collision position estimator section estimates the second-time collision position of the occupant on the two-wheel mobile object which collides with the vehicle; the operation device selector section selects the external protection device corresponding to the second-time collision position estimated by the second-time collision position estimator section. The operation instructor section operates the external protection device selected by the operation device selector section. The external protection device corresponding to the second-time collision position estimated by the second-time collision position estimator section is equivalent to the external protection device corresponding to the region in which the occupant on the two-wheel mobile object has a risk of a second-time collision with the vehicle. That is, the above protection control apparatus operates selectively the external protection device corresponding to the region, which provides a possibility that the occupant on a bicycle colliding with the vehicle has a second-time collision.

The above configuration does not operate the external protection device when there is no possibility that the occupant on the two-wheel mobile object has a second-time collision with the vehicle. In addition, even if there is a possibility that the occupant on the two-wheel mobile object has a second-time collision with the vehicle, the external protection device corresponding to a region with no possibility of a second-time collision is not operated. This protects the occupant on the two-wheel mobile object while suppressing an operation of the external protection device which fails to contribute to the protection of the occupant on the two-wheel mobile object.

That is, the above configuration can suppress an operation of the external protection device useless in respect of protecting an occupant on a two-wheel mobile object in a case that the vehicle has a first-time collision with the two-wheel mobile object.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram for explaining a first-time collision position;

FIG. 4 is a diagram illustrating an example of a schematic configuration of an estimation data;

FIG. 5 is a diagram illustrating a schematic configuration of a head part data included in a left side data;

EMBODIMENTS FOR CARRYING OUT INVENTION

Figure 1:
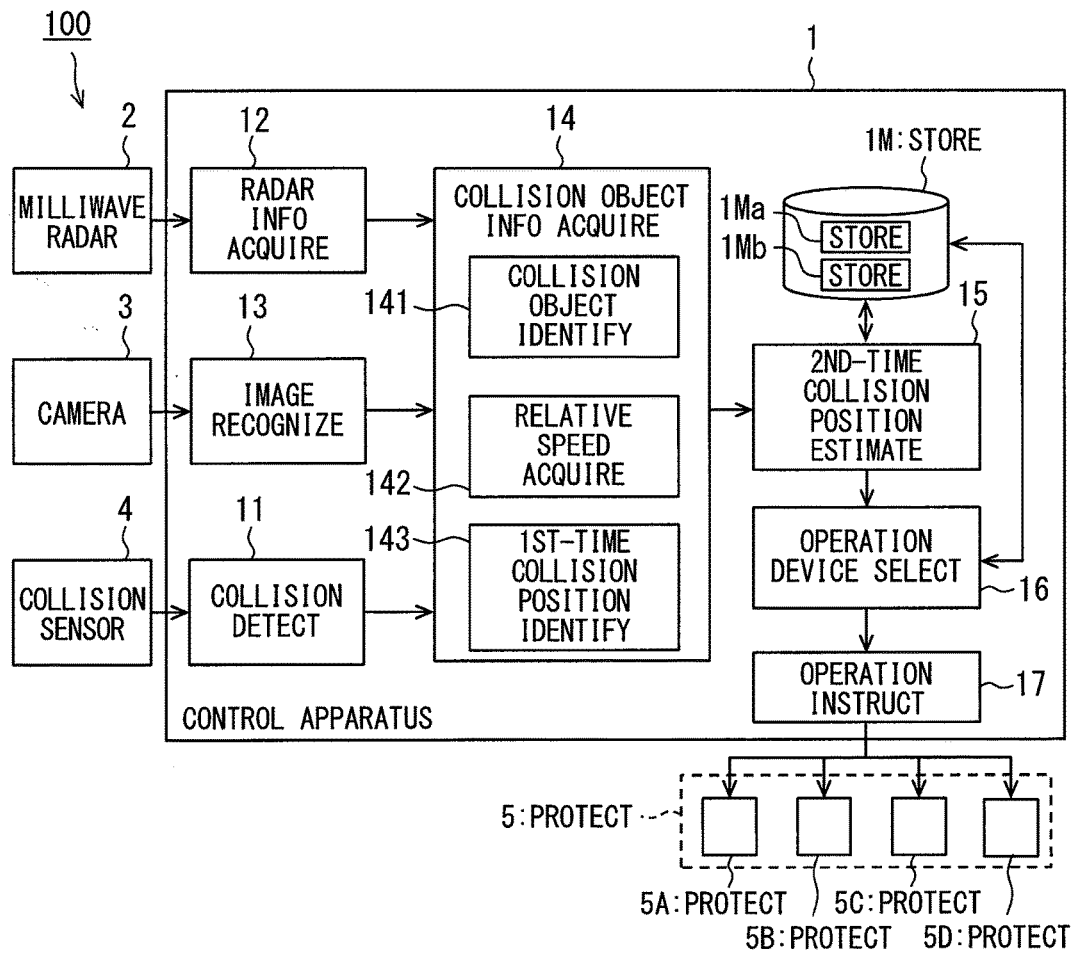
FIG. 1 is a block diagram illustrating an example of a schematic configuration of a protection device control system.

The following explains an embodiment of the present disclosure with reference to drawings. FIG. 1 is a block diagram illustrating an example of a schematic configuration of a protection device control system 100 according to the present embodiment. This protection device control system 100 is mounted in a vehicle. For convenience, a vehicle in which this protection device control system 100 is mounted is referred to as a host vehicle.

This protection device control system 100 mainly protects an occupant on a two-wheel mobile object such as a bicycle, a motorized bicycle, or a motorcycle. The following indicates a mode assuming a case where a bicycle that rushes out from an area on a left side relative to the host vehicle has a first-time collision with a host vehicle at a front end part (including a proximity of a front end corner) of the host vehicle.

Naturally, the kind of a mobile object as a collision target, or a collision mode is not limited to the example illustrated in the present embodiment. The protection device control system 100 according to another configuration may be a system assuming a case where a collision occurs at a side part of the host vehicle or a rear end part of the host vehicle. In that case, the protection device control system 100 illustrated herein may be modified as needed to accord with the assumed collision direction. In addition, the two-wheel mobile object as a collision target is not limited to a bicycle which an occupant rides, but may be a two-wheel mobile object other than a bicycle, such as a motorcycle which an occupant rides. The protection device control system 100 may be modified and applied as needed depending on the kind of a two-wheel mobile object that is assumed.

The protection device control system 100 in the present embodiment includes a control apparatus 1, a milliwave radar 2, a camera 3, a collision sensor 4, and external protection devices 5, as indicated in FIG. 1. The control apparatus 1 is connected with each of the milliwave radar 2, the camera 3, the collision sensor 4, and the external protection devices 5, via a communication network built in the host vehicle.

The control apparatus 1 controls an operation of each external protection device 5 based on the data provided by the milliwave radar 2, the camera 3, or the collision sensor 4. This control apparatus 1 is equivalent to a protection control apparatus. The control apparatus 1 will be explained later after explaining the milliwave radar 2, the camera 3, the collision sensors 4, and the external protection devices 5.

The milliwave radar 2 acquires the information on object that is present in a predetermined range ahead of the host vehicle (defined as a radar detection area 21) by transmitting and receiving millimeter waves or submillimeter waves. In detail, while detecting the object present in the radar detection area 21, the milliwave radar 2 estimates a direction, a distance, a relative speed, a kind, etc. The milliwave radar 2 provides a detection result to the control apparatus 1 successively.

The kind of a detection object may be identified based on a reception level, etc., of reflected waves corresponding to the detection object. In addition, identifying the kind of the detection object may use the information such as a magnitude of a detection object, a movement speed of a detection object which is acquired from the movement speed of the host vehicle and the detected relative speed, other than the reception level. Identifying the kind of the detection object may use a known technology; thus, the detailed explanation is omitted.

Figure 2:
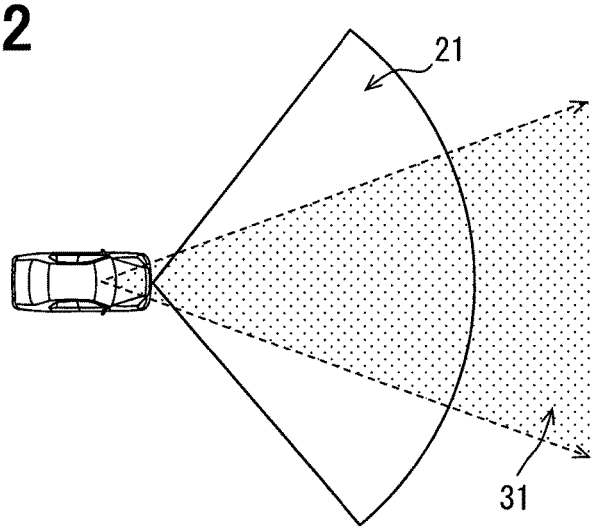
FIG. 2 is a schematic diagram illustrating a radar detection area and an image capture range.

The radar detection area 21 is schematically indicated in FIG. 2. The radar detection area 21 has a range according to the installed position, the directionality, and the maximum detection distance of the milliwave radar 2. The installed position or installed posture of the milliwave radar 2 may be determined as needed so as to form an intended radar detection area 21; for instance, the milliwave radar 2 may be arranged in a front grille or a front bumper so as to enable the directional central direction to be towards a front area ahead of the host vehicle. The milliwave radar 2 has an angle of beam spread of 45 degrees in a horizontal direction and the maximum detection distance of 35 m from a front end of the host vehicle.

In the present embodiment, as an example, the milliwave radar 2 analyzes the reception result of the reflected waves so as to estimate specific data such as a direction or a distance in which a detection object is present, a relative speed or a kind of a detection object. However, there is no need to be limited thereto. Another configuration may be provided in which the milliwave radar 2 provides a reception result of reflected waves to the control apparatus 1 while the control apparatus 1 analyzes the reception result provided by the milliwave radar 2, to thereby estimate specific data such as a direction or a distance in which a detection object is present, a relative speed or a kind of a detection object.

In addition, yet another configuration may be adopted, where a laser radar replacing the milliwave radar 2 is used as a radar apparatus which detects an object which is present ahead of the host vehicle. Furthermore, both the milliwave radar 2 and the laser radar may be adopted. When a high-performance milliwave radar or laser radar is used to provide a relatively higher accurate detection of an outline or a magnitude of an object present in the radar detection area 21, it is desirable to determine the kind of the detection object more finely. For example, it is preferable that a known pattern matching process is used to identify which one the detection object corresponds to among a pedestrian, a two-wheel mobile object, and a four-wheel vehicle based on an outline or a magnitude of a detection object.

The camera 3 may be an optical camera such as a CMOS camera, a CCD camera. The camera 3 may be installed adjacent to an upper end of the windshield (for example, near the room mirror), so as to capture an image in a predetermined range (i.e., a capture range 31) ahead of the host vehicle, as in FIG. 2. The image data captured by the camera 3 is provided to the control apparatus 1 successively.

The camera 3 may naturally be installed at not only a position near the room mirror but also another position not interrupting the visual field of the driver towards a front area ahead of the host vehicle. In addition, the camera 3 may alternatively be an infrared camera or a near infrared camera. Furthermore, the camera 3 may be a stereo camera.

The collision sensor 4, which is a sensor for detecting a collision (defined as a first-time collision) between (i) an object other than the host vehicle and (ii) a front end part of the host vehicle, is installed at a front bumper of the host vehicle. The collision sensor 4 outputs a value according to a magnitude of an impact from the collision, to the control apparatus 1.

This collision sensor 4 may be provided by using a pressure sensor for detecting a pressure in a tube (or chamber) arranged in the front bumper, for instance. The collision sensor 4 may not be limited to such a pressure-type sensor. For example, it may be a type which detects a collision based on change in a light amount outputted from an optical fiber arranged along the body of the host vehicle. In addition, an acceleration sensor may be used as the collision sensor 4.

The external protection device 5 is an apparatus that alleviates an impact given to a human being who has a second-time collision with the host vehicle, thereby protecting the human being. The external protection device 5 includes a pop-up hood that lifts instantaneously a rear of the hood and an external air bag inflating towards a predetermined region outside of the host vehicle. The second-time collision indicates that an occupant on a two-wheel mobile object, which has a first-time collision with the host vehicle, collides with the host vehicle or the road surface due to the impact from the first-time collision.

The external protection device 5 includes a pop-up hood 5A, a right pillar air bag 5B, a left pillar air bag 5C that is an air bag inflated along a front pillar on the left side part of the host vehicle, and a windshield air bag (hereinafter, referred to as a WS air bag) 5D. The pop-up hood 5A has a corresponding region that is a hood portion. The right pillar air bag 5B, which is an air bag inflated along the front pillar on the right side part of the host vehicle, has a corresponding region that is a predetermined range along the front pillar on the right side part of the host vehicle. The left pillar air bag 5C, which is an air bag inflated along the front pillar on the left of the host vehicle, has a corresponding region that is a predetermined range along the front pillar on the left side part of the host vehicle. The WS air bag 5D, which is an air bag inflated to cover a cowling top and the windshield, has a corresponding region from the cowling top to the top end part of the windshield.

A corresponding region of an external protection device 5 signifies a region in which the external protection device 5 operates to thereby relieve an impact given to a human being colliding with a host vehicle. The external protection device 5 operates based on an instruction from the control apparatus 1. Note that the present embodiment describes an example of a configuration where the host vehicle includes a plurality of external protection devices 5; however, there is no need to be limited thereto. The number of external protection devices 5 mounted in the host vehicle may be only one.

The control apparatus 1 selects an external protection device 5 that needs to be operated based on the various signals inputted from the milliwave radar 2, the camera 3, and the collision sensor 4, thereby operating the external protection device 5. As one example, this control apparatus 1 according to the present embodiment is configured as a usual computer to include a CPU, a RAM as a primary storage device (so-called a memory), a flash memory as an auxiliary storage device (so-called a storage), an I/O, and a bus line that connects the foregoing.

The storage stores a program for operating a usual computer as the control apparatus 1 according to the present embodiment, corresponding region data indicating a corresponding region of each external protection device 5, and an estimation data, which are mentioned later.

The control apparatus 1 includes, as functional blocks achieved by executing the above program, a collision detector section 11 (or a collision detector 11), a radar information acquirer section 12 (or a radar information acquirer 12), an image recognizer section 13 (an image recognizer 13), a collision object information acquirer section 14 (or a collision object information acquirer 14), a second-time collision position estimator section 15 (or a second-time collision position estimator 15), an operation device selector section 16 (or an operation device selector 16), and an operation instructor section 17 (or an operation instructor 17). Note that each of the functional blocks included in the control apparatus 1 may be achieved as hardware circuits such as one or more ICs.

In addition, the control apparatus 1 includes a data storage part (or data memory) 1M which stores the various data described hereinafter. The data storage part 1M may be achieved using a storage media (RAM or flash memory) included in the control apparatus 1. The present embodiment describes, as an example, the data storage part 1M achieved by a RAM. In addition, the estimation data or the corresponding region data are read from a flash memory upon the activation of the control apparatus 1, and are stored in the RAM serving as the data storage part 1M. In FIG. 1, the reference sign 1Ma illustrates a storage region that stores the estimation data; the reference sign 1Mb illustrates a storage region that stores the corresponding region data. The storage region 1Ma which stores the estimation data is equivalent to an estimation data storage part or an estimation data memory; the storage region 1Mb which stores the corresponding region data is equivalent to a corresponding region storage part or a corresponding region memory.

The collision detector section 11 acquires an output value of the collision sensor 4 and detects the first-time collision between an object and a front end part of the host vehicle, based on the output value. In detail, suppose a case when the output value of the collision sensor 4 is equal to or greater than a collision determination threshold value, which is used to determine whether to have collided with an object. In such a case, the collision detector section 11 determines that a first-collision has occurred, then providing the collision object information acquirer section 14 with a collision detection signal that indicates that a collision has occurred in the front end part.

The radar information acquirer section 12 acquires a detection result of the milliwave radar 2, i.e., the information on the object present in the radar detection area 21. The detection result acquired by the radar information acquirer section 12 is provided to the collision object information acquirer section 14.

The image recognizer section 13 analyzes the image data inputted from the camera 3, detects an object that is previously designated as a target for detection, and identifies the kind of the object. For example, the image recognizer section 13 performs well-known image processing such as edge detection, to the image data, and extracts the outlines of all the objects contained in the image. The image data having undergone the image processing is then subjected to the pattern matching process; this allows the detection of the object and the identification of the kind of the object.

An object as a detection target may be designed as needed; a bicycle as a mobile object is at least registered as a detection target. A bicycle as a mobile object signifies a bicycle which an occupant rides (a bicycle with an occupant). Naturally, the object as a detection target is not limited to the bicycle. Objects designated as a detection target may include a two-wheel mobile object of another kind, a pedestrian, a four wheel vehicle, a structure such as a telephone pole. As a preferable example, the image recognizer section 13 is designed to detect the various objects mentioned above. Those objects are detected from the image data using the data (i.e., the image recognition data), which may be stored in a storage media (unshown). The image recognition data corresponds to the data representing the shape patterns of the kinds of the objects that are detection targets.

In addition, the image recognizer section 13 estimates a relative distance between a detection object and the host vehicle from the position and magnitude of the detection object in the image data. Furthermore, the object, which was once detected, is traced by employing a well-known object tracing technique. This allows the estimation of a relative movement direction and movement speed of the detection object from the change degree in the position or the magnitude between a plurality of successive frames.

If a stereo camera is used as the camera 3, the relative position may be estimated from the change in the position of an identical object in the respective image data. The result of the image recognition process by the image recognizer section 13 is provided to the collision object information acquirer section 14. The radar information acquirer section 12 and the image recognizer section 13 each are equivalent to an object recognizer section or an object recognizer.

The collision object information acquirer section 14 acquires the information about an object which is present in a predetermined range (defined as a front detection area) ahead of the host vehicle using complementarily (i) the detection result of the milliwave radar acquired by the radar information acquirer section 12 and (ii) the recognition result of the image recognizer section 13. In detail, the kind, the relative position, and the relative speed of a mobile object which is present in the front detection area are acquired.

Note that a relative position may be represented by coordinates in a plane coordinate system (defined as XY coordinate system) which sets a vehicle forth-and-back direction as an X-axis and a vehicle width direction as a Y-axis. The origin of the XY coordinate system may be the center in the host vehicle width direction within a vehicle front end part, for instance, In addition, the positive direction in the X-axis is defined as the direction from the vehicle front end part to the vehicle rear end part; the positive direction in the Y-axis is defined as the direction from the vehicle left side part to the vehicle right side part.

The front detection area is a region that covers both the radar detection area 21 and the image capture range 31. The front detection area is equivalent to a detection area, The technology using complementarily the detection result of milliwave radar and the recognition result by the image recognizer section 13 is a common knowledge as a sensor fusion technology; thus, the explanation is omitted.

In addition, this collision object information acquirer section 14 includes a collision object identifier section 141 (or a collision object identifier 141), a relative speed acquirer section 142 (or a relative speed acquirer 112), and a first-time collision position identifier section 143 (or a first-time collision position identifier 143), as finer functional blocks.

The collision object identifier section 141 identifies a collision object based on the information about objects which are collected successively as being present in the front detection area, in response to that the collision detector section 11 detects an occurrence of a collision. Assume a case that the collision object is a bicycle with an occupant tentatively. In such a case, the collision object identifier section 141 comes to detect a collision between the host vehicle and the bicycle with the occupant. That is, this collision object identifier section 141 is equivalent to a first-time collision detector section or a first-time collision detector.

As one example, the collision object identifier section 141 determines, as the collision object, the detection object which is present in the position nearest to the host vehicle at the collision occurrence time (or just before the collision occurrence time) among the detection objects which are present in the front detection area. Note that when the position of the object which is present in the position nearest to the host vehicle is separate from the host vehicle a predetermined distance (for example, 3 m) or longer, there is a possibility that the host vehicle contacts an object other than the detection object. When the distance between the host vehicle and the detection object which is present in the position nearest to the host vehicle is a predetermined distance or longer, it is thus determined that the collision object is another object which cannot be caught by the milliwave radar 2 or the camera 3.

When the collision object identifier section 141 determines that the collision object is a bicycle with an occupant, the relative speed acquirer section 142 acquires the relative speed of the bicycle with the occupant as the collision object just before the collision. Note that this relative speed includes a concept of a relative movement direction; the relative speed acquirer section 142 acquires a relative speed to be decomposed as an X axial direction speed Vx which is a component of the X axial direction (that is, the vehicle forth-and-back direction) and a Y axial direction speed W which is a component of the Y axial direction (that is, the vehicle width direction). The relative speed of the bicycle with the occupant as the collision object just before the collision is equivalent to a relative vector. In addition, the relative speed acquirer section 142 is equivalent to a relative vector estimator section or a relative vector estimator.

When the collision object identifier section 141 determines that the collision object is a bicycle with an occupant, the first-time collision position identifier section 143 acquires the relative position of the gravity center in the bicycle with the occupant as the collision object, just before the collision. The position of the gravity center in the bicycle with the occupant may be set as an intermediate position between the front wheel and the rear wheel of the bicycle. As another example, the position of the bicycle at which the bicyclist rides the bicycle (for example, the position of the bicyclists waist) may be set as the position of the gravity center in the bicycle with the occupant.

In addition, in the present embodiment, the first-time collision position identifier section 143 defines five segmental parts within a region covering a vehicle front end part and its laterally adjacent parts. The five segmental parts are a left side part Z1, a left front end part Z2, a center part Z3, a right front end part Z4, and a right side part Z5, as in FIG. 3. The first-time collision position identifier section 143 thereby determines which one of the five segmental parts the first-time collision position belongs to.

The left side part Z1 signifies a segmental part to leftward of the left corner of the front end part of the host vehicle; the left front end part Z2 signifies a segmental part ranging from the left corner towards the center of the front end part by a constant distance (for example, 0.4 m); The right side part Z5 signifies a segmental part to rightward of the right corner of the front end part of the host vehicle; and the right front end part Z4 signifies a segmental part ranging from the right corner towards the center of the front end part by a constant distance (for example, 0.4 m). The center part Z3 signifies a segmental part sandwiched between the left front end part Z2 and the right front end part Z4.

Suppose a situation where a first-time collision occurs between a front end part of a host vehicle and a bicycle with an occupant rushing out from the left side relative to the host vehicle. In such a situation, the first-time collision position corresponding to the left side part Z1 signifies the case where the collision occurs between the front wheel part of the bicycle and the vehicle front end part (for example, the left front end part Z2). In contrast, the first-time collision position corresponding to the right side part Z5 signifies the case where the collision occurs between the rear wheel part of the bicycle and the vehicle front end part (for example, the right front end part Z4).

Note that the left front end part Z2, the center part Z3, and the right front end part Z4 may be designed as needed. The present embodiment describes, as one example, dividing of the vehicle width direction into the five segmental parts, but may be also more finely dividing it into seven or nine segmental parts. Furthermore, the first-time collision position may be indicated with the coordinates of the XY coordinate system as another configuration.

When the collision object identifier section 141 determines that the collision object is a bicycle with an occupant, the relative speed acquired by the relative speed acquirer section 142 and the second-time collision position identified by the second-time collision position identifier section 143 are provided to the second-time collision position estimator section 15.

The second-time collision position estimator section 15 estimates a second-time collision position that is a position at which the second-time collision occurs between the body of the host vehicle and a predetermined protection target member such as a head part or a chest part of the occupant on the bicycle colliding with the host vehicle, based on (i) the relative speed and first-time collision position of the bicycle with the occupant as a collision object which are provided from the collision object information acquirer section 14, and (ii) the estimation data stored in the data storage part 1M.

In the present embodiment, on the premise that the head part and the chest part are each set as a protection target member, the second-time collision position estimator section 15 estimates each of a second-time collision position of the head part on an outer surface of the vehicle body and a second-time collision position of the chest part on an outer surface of the vehicle body, based on the relative speed of the bicycle with the occupant as a collision object, on the first-time collision position, and on the estimation data. The second-time collision position estimated by the second-time collision position estimator section 15 is provided to the operation device selector section 16. Note that the estimation data is, as mentioned later, the data indicating the correspondence relation among the relative speed of the bicycle with the occupant as a collision object, the first-time collision position, and the second-time collision position of each protection target member.

The operation device selector section 16 selects an operation device among a plurality of external protection devices 5 mounted in the host vehicle; the operation device, which is an external protection device intended to be operated, is the external protection device 5 corresponding to the second-time collision position estimated by the second-time collision position estimator section 15. For example, when the second-time collision position of the head part corresponds to the windshield and the second-time collision position of the chest part corresponds to the hood part, the pop-up hood 5A and the WS air bag 5D are selected respectively as operation devices.

The external protection device 5 corresponding to the second-time collision position estimated by the second-time collision position estimator section 15 is equivalent to an external protection device 5 corresponding to the region in which the occupant on the two-wheel mobile object has a risk of a second-time collision with the host vehicle. That is, the external protection device 5 corresponding to the second-time collision position is an external protection device 5 which can protect the occupant on the two-wheel mobile object, which had the first-time collision with the host vehicle, from the second-time collision. In other words, the operation device selector section 16 prevents the selection of an external protection device that fails to contribute to the protection of the occupant on the two-wheel mobile object going to have a second-time collision with the host vehicle (i.e., preventing the selection of an external protection device that fails to protect the occupant).

The operation instructor section 17 outputs an operation instruction signal giving an instruction of operation to an external protection device 5 selected by the operation device selector section 16, thereby operating the selected external protection device 5. Such a configuration enables the operation of the external protection device 5 which can protect the occupant on the two-wheel mobile object having had the first-time collision with the host vehicle.

<Estimation Data>

The following explains the estimation data Dl. The estimation data Dl is used along with the relative speed and the first-time collision position of the bicycle with the occupant as a collision object. Based on those data, the second-time collision position estimator section 15 estimates the second-time collision position of a protection target member.

The estimation data may be provided in a list format, as in FIG. 4, listing the data D11 to D15 corresponding to the respective first-time collision positions Z1 to Z5. The data D11 to D15 corresponding to the respective first-time collision positions Z1 to Z5 contain the data with respect to each protection target member; the data specific to each protection target member in the first-time collision position indicates a correspondence relation between the second-time collision position and the relative speed of the protection target member.

For example, the data D11 is a data (hereinafter, referred to as a left side data) indicating a correspondence relation between the second-time collision position and the relative speed of each protection target member in the case of the first-time collision position being the left side part Z1. The left side data D11, which relates to the first-time collision position being the left side part Z1, contains (i) a head part data Dill indicating a correspondence relation between the second-time collision position and the relative speed of the head part, and (ii) a chest part data D112 indicating a correspondence relation between the second-time collision position and the relative speed of the chest part.

Using FIG. 5, which is a diagram illustrating a configuration of a head part data Dill included in a left side data D11, a schematic configuration of the data will be explained which indicates a correspondence relation between the second-time collision position and the relative speed of each protection target member.

The head part data D111 is a data indicating the second-time collision position of the head part depending on the Y axial direction speed Vy and the X axial direction speed Vx of the bicycle with the occupant with respect to the host vehicle, as indicated in FIG. 5. The present embodiment describes an example of the head part date D111 as follows. First, the X axial direction speed and the Y axial direction speed are each classified by dividing a possible range into a plurality of speed segments with predetermined widths; a correspondence relation is illustrated among the Y axial direction speed Vy, the X axial direction speed Vx, and the second-time collision position in a table format.

When such an estimation data is used, the second-time collision position estimator section 15 estimates the second-time collision position of the head part based on the combination of the speed segments of the X axial direction speed Vx and the Y axial direction speed Vy acquired by the relative speed acquirer section 142. For example, suppose a case where the first-time collision position is the left side part Z1, the Y axial direction speed Vy is 10 km/h, and the X axial direction speed Vx is 20 km/h. Such a case estimates the second-time collision position of the head part to be the A pillar on the left front side part of the host vehicle.

Note that, in FIG. 5, "WS" is the windshield; "-" is a road surface (that is, not having a second-time collision); "*" is a part in the vehicle body of the host vehicle to which any external protection device 5 does not correspond. Such data enables the determination of not only a second-time collision position but also whether or not a second-time collision occurs.

For convenience, although the left side data all and the head part data D111 included in the left side data all are described in the above, the data corresponding to another first-time collision position is configured similarly.

The estimation data D1 described above may be generated by performing simulations or real vehicle experiments. Further, the second-time collision position, which is not determined uniquely only based on the relative speed and the first-time collision position, changes also based on the shape of the host vehicle where the protection device control system 100 is mounted, on the magnitude of the bicycle with the occupant as a collision object, on the height of the heading direction of the bicycle at the time of the collision, or on the occupant's center of gravity. The estimation data D1 may thus be a data considering the above various elements.

From a standpoint of reducing a processing load of a CPU included in the control apparatus 1, the present embodiment describes an example of a configuration that estimates the second-time collision position of a protection target member such as a head part or a chest part based on the previously designed estimation data. However, there is no need to be limited thereto. The inventors acquire the following finding about the behavior of an occupant on a bicycle after the first-time collision with a host vehicle, as a result of carrying out the various experiments for designing the above estimation data. The details of the finding will be explained later.

The second-time collision position estimator section 15 may be configured to calculate the second-time collision position based on the behavior patterns which are modeled from the behaviors of the occupant after the first-time collision from the finding. The behavior patterns may be represented as functions with parameters such as a first-time collision position or a relative speed.

<Behavior of Occupant on Bicycle After First-Time Collision>

Figure 6:
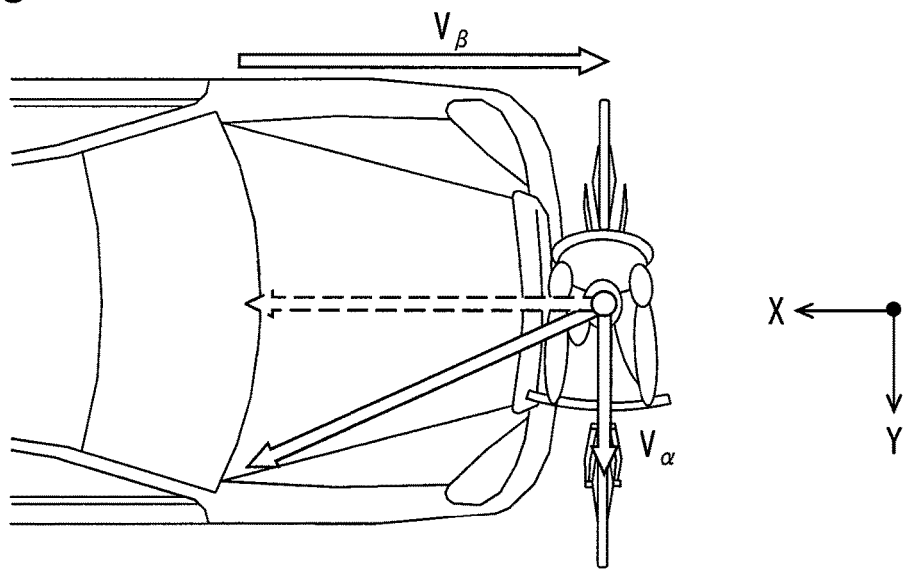
FIG. 6 is a schematic diagram illustrating an example of a collision mode between a host vehicle and a bicycle with an occupant.
Figure 7:
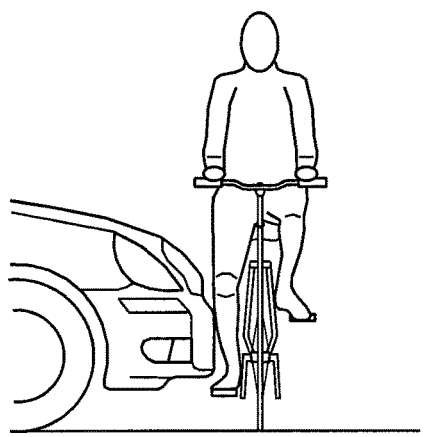
FIG. 7 is a schematic diagram illustrating an example of a collision mode between a host vehicle and a bicycle with an occupant.
Figure 8:
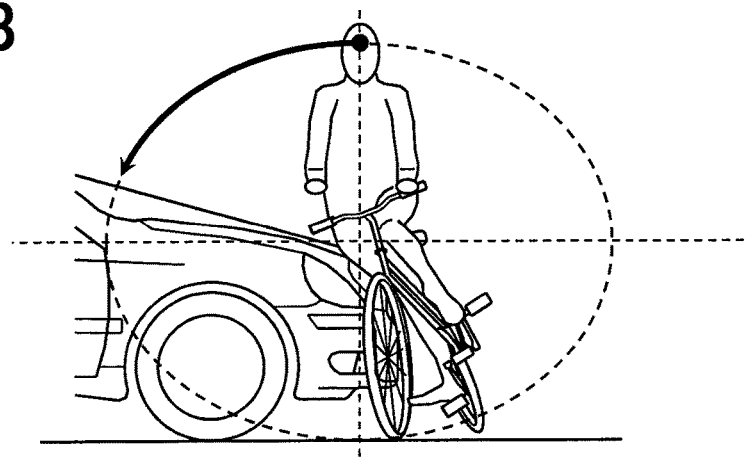
FIG. 8 is a diagram for explaining a behavior of an occupant when a host vehicle collides with a bicycle with the occupant.

The following explains examples of behaviors up to a second-time collision of an occupant on a bicycle in response to that the bicycle with the occupant collides with a front end part of a host vehicle, with reference to FIGS. 6, 7, and 8. The following supposes a situation where a leg of an occupant collides with the center part Z3 in the front end part of the host vehicle under states that the bicycle with the occupant runs in the X axial direction by a speed Vα (for example, 10 km/h) and the host vehicle runs forward by a speed Vβ (for example, 30 km/h).

Under the above supposed situation, when the front end part of the host vehicle and the occupants leg collide with each other, an upper part above the waist (that is, upper half of the body) of the occupants body moves approximately parallel towards the vehicle in compliance with a law of inertia until the occupant's lumbar part contacts the vehicle body. In addition, the lower half of the body such as a leg exhibits a posture along the shape of the vehicle. While the bicycle receives a force due to the vehicle front end part to push the bicycle in the vehicle forward direction, the upper part of the bicycle contacting the body of the occupant is pulled towards the vehicle; thus, the bicycle exhibits also a posture falling onto the vehicle.

Then, as illustrated in FIG. 8, when the body of the vehicle and the occupant's lumbar part collide with each other, the occupant starts a rotation motion such that the upper half of the body including the head part falls onto the vehicle. The locus of the head part of the occupant in that case can be approximated as an ellipse centering on the position where the lumbar part and the body contact each other. The contacting position as a center of the elliptical orbit between the lumbar part and the vehicle body is determined depending on (i) the vehicle shape such as a height of the front end part of the vehicle and (ii) the height of the occupant's lumbar part. In addition, the lengths of the major axis and the minor axis of the elliptical orbit are determined depending on (i) the relative speed and (ii) the length from the occupant's lumbar part to the head part.

Therefore, the second-time collision position estimator section 15 can estimate the second-time collision position of the head part by considering both (i) the elliptical orbit as a locus of the head part, which is determined based on the vehicle shape, the occupants posture, the relative speed, the collision position, etc., and (ii) the region forming the body of the vehicle. In other words, the second-time collision position estimator section 15 defines a function corresponding to the occupant's behavior mentioned above, thereby estimating the second-time collision position of the head part even without using the table indicated in FIG. 5.

The above describes, as an example, a configuration that estimates the second-time collision position of the head part; however, the chest part or another member other than the head part may be estimated similarly. In addition, the estimated second-time collision position and the first-time collision position of the head part may be used to estimate the second-time collision position of the chest part or hand or foot.

<Protection Device Control Process>

Figure 9:
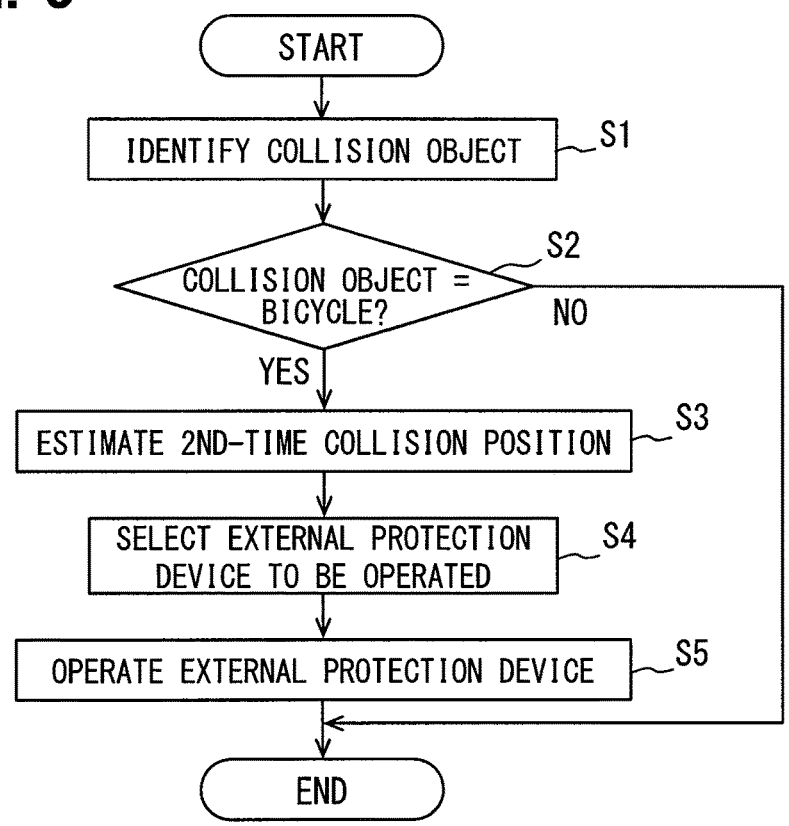
FIG. 9 is a flowchart for explaining a protection device control process executed by a control apparatus.

The following explains a process for protecting an occupant on a bicycle from the second-time collision (referred to as a protection device control process) which the control apparatus 1 performs using a flowchart indicated in FIG. 9. The flowchart indicated in FIG. 9 may be started when the collision detector section 11 detects a first-time collision, for example.

It is further noted that a flowchart to be described includes sections (also referred to as steps), which are represented, for instance, as S1. Further, each section can be divided into several sections while several sections can be combined into a single section. Each section may be referred to as a device or a specific name, or with a structure modification; for instance, a first-time collision detector section may be also referred to as a first-time collision detector device or a first-time collision detector. Further, each section can be achieved not only (i) as a software section in combination with a hardware unit (e.g., computer), but also (ii) as a section of a hardware circuit (e.g., integrated circuit, hard-wired logic circuit), including or not including a function of a related apparatus. Further, the section of the hardware circuit may be inside of a microcomputer.

First, in S1, the collision object identifier section 141 identifies a collision object. As a result of the identification process in S1, when the collision object is a bicycle with an occupant and S2 is thus determined as YES, the sequence proceeds to S3. In contrast, when a collision object is not determined to be a bicycle with an occupant and S2 is thus determined as NO, the present process is ended.

When the collision object identifier section 141 determines in S1 that the collision object is a bicycle with an occupant, the relative speed acquirer section 142 acquires the X axial direction speed Vx and the Y axial direction speed Vy of the bicycle with the occupant as the collision object, while the first-time collision position identifier section 143 identifies the first-time collision position. The collision object information acquirer section 14 provides the second-time collision position estimator section 15 with the X axial direction speed Vx, the Y axial direction speed Vy, and the first-time collision position of the bicycle with the occupant as a collision object.

In S3, the second-time collision position estimator section 15 estimates the second-time collision position of the head part and the chest part of the occupant on the bicycle which collides with the host vehicle, based on (i) the relative speed of the bicycle with the occupant which had the first-time collision with the host vehicle, (ii) the first-time collision position, and (iii) the estimation data; then, the sequence proceeds to 54.

In S4, the operation device selector section 16 selects an operation device among the external protection devices 5 based on the second-time collision position estimated by the second-time collision position estimator section 15. In detail, the external protection device 5 corresponding to the second-time collision position estimated by the second-time collision position estimator section 15 is selected as an external protection device 5 that is intended to be operated. When any external protection devices 5 included in the host vehicle fails to correspond to the second-time collision position, or when the second-time collision with the host vehicle is determined not to occur, none of the external protection devices 5 is selected as an operation device. When S4 is completed, the sequence proceeds to S5.

In S5, the operation instructor section 17 outputs an operation instruction signal to the external protection device 5 that is selected by the operation device selector section 16; then, the present process is ended.

<Summary of Present Embodiment>

Under the above configuration, the second-time collision position estimator section 15 estimates the second-time collision position of the occupant on the bicycle which collides with the host vehicle; the operation device selector section 16 selects the external protection device 5 corresponding to the part at which the occupant has the second-time collision. The operation instructor section 17 then operates the selected external protection device 5. That is, the external protection device 5 corresponding to the second-time collision position of the occupant on the bicycle which had collided with the host vehicle is operated.

According to such a configuration, even in a case where the output value of the collision sensor 4 is equal to or greater than a collision determination threshold value, the external protection device 5 corresponding to a region not having a risk of the second-time collision is not operated. That is, according to the above configuration, when the bicycle with the occupant has the first-time collision with the host vehicle, an operation of the protection device unnecessary for protection of the occupant on the bicycle can be suppressed.

Note that there is a difference, in the behavior after having the first-time collision with a host vehicle, between a pedestrian having the first-time collision and an occupant riding a bicycle having the first-time collision from the following reasons: the bicycle and its occupant are mutually separate objects; the bicycle with the occupant has a movement speed greater than that of the pedestrian; or the center of gravity in the occupant on the bicycle is located in a position higher than that of the pedestrian.

For example, suppose a case where the Y axial direction speed Vy of the bicycle with the occupant at the time of undergoing the first-time collision with the host vehicle is great enough. In such a case, there is a possibility that the occupant on the bicycle is hit onto a road surface that is located on a bicycle's heading direction side relative to the host vehicle due to the law of inertia without an occurrence of a second-time collision between the occupant on the bicycle and the host vehicle.

Figure 10:
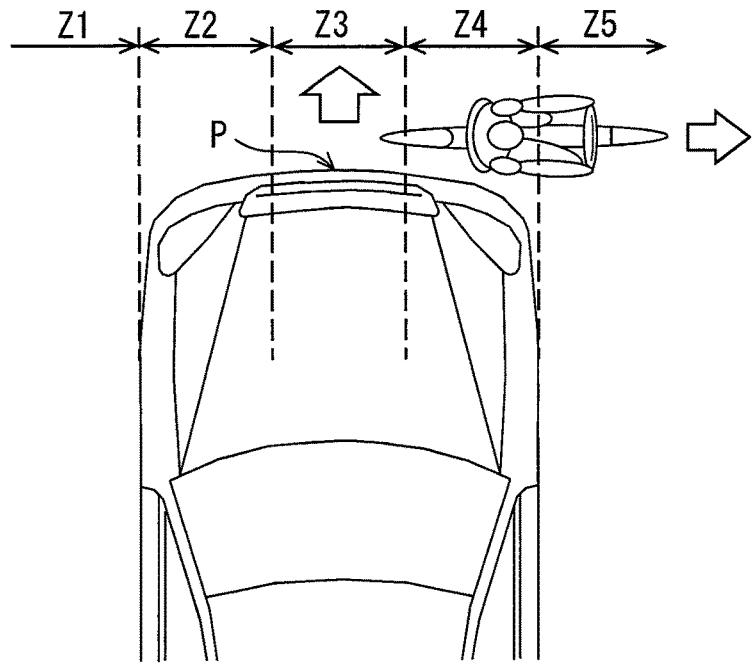
FIG. 10 is a schematic diagram for explaining an operation of a second-time collision position estimator section.

In detail, the inventors have gained a finding as a result of the various experiments, as follows. Refer to FIG. 10. Suppose a case where the position of the first-time collision with the bicycle is in a region in the front end part of the vehicle, the region being deviated from the center P of the front end part towards the heading direction of the bicycle, and, simultaneously, the Y axial direction speed of the bicycle with the occupant is equal to or greater than 10 km/h. In such a case, the occupant on the bicycle having the first-time collision with the host vehicle has a tendency to collide with a road surface on the side of the heading direction of the bicycle, without having a second-time collision with the host vehicle, The region, which is in the front end part of the vehicle and is deviated from the center P of the front end part towards the heading direction of the bicycle, corresponds to the region rightward of the center P when the bicycle runs towards the right side in the vehicle width direction, In addition, unlike a pedestrian, a bicycle has body parts such as a front wheel and a rear wheel in the heading direction. Even though a bicycle with an occupant collides with the host vehicle, the occupant on the bicycle is not necessarily present in the front of the host vehicle, In particular, when only either the front wheel or the rear wheel of the bicycle contacts the front end part of the vehicle, the occupant on the bicycle tends to be flipped towards the lateral region relative to the host vehicle. In such a case, the second-time collision between the occupant on the bicycle and the host vehicle does not occur, after all.

That is, a behavior of a human being serving as a protection target changes depending on whether a mobile object having a first-time collision is a pedestrian or a bicycle with an occupant. A case where the collision object is a bicycle with an occupant has relatively high possibility of not having a second-time collision with the host vehicle, as compared with a case where the collision object is a pedestrian. In other words, even though a first-time collision has occurred, a case where the collision object is a bicycle with an occupant has relatively high possibility of not needing operating an external protection device 5, as compared with a case where the collision object is a pedestrian.

A conventional art, which has examined various systems of operating an external protection device 5 in response to the detection of a first-time collision with a pedestrian, does not consider the above difference. Under the above situation, the configuration according to the present embodiment does not operate any external protection device 5 when there is no risk of a second-time collision between a host vehicle and an occupant on a bicycle. In addition, even if there is a risk of a second-time collision between a host vehicle and an occupant on a bicycle, an external protection device 5 corresponding to a part of a body of the host vehicle having no risk of a second-time collision is not operated. The above configuration can suppress an unnecessary operation of an external protection device 5 while protecting an occupant on a bicycle, also reducing a wastefulness due to an unnecessary operation of an external protection device 5.

Further, from the above finding, the second-time collision position estimator section 15 may estimate that no second-time collision occurs when (i) the first-time collision position of a bicycle with an occupant is in a region, which is in the front end part of the host vehicle and deviated from the center P of the front end part towards the heading direction of the bicycle, and, simultaneously, (ii) the Y axial direction speed of the bicycle is equal to or greater than 10 km/h. In this case, the operation device selector section 16 presumes that an external protection device 5 that needs to be operated is not present.

That is, any external protection device 5 provided in a host vehicle is not operated when (i) the first-time collision position is in a region, which is in the front end part of the host vehicle and deviated from the center P in a vehicle width direction of the front end part towards a heading direction of the bicycle, and, simultaneously, (ii) the Y axial direction speed is equal to or greater than 10 km/h. This can reduce an unnecessary operation of an external protection device 5.

The embodiment of the present disclosure is described in the above; however, the present disclosure is not limited to the above embodiment. The following embodiment is also included in the technical scope of the present disclosure; furthermore, another embodiment or modification other than the following is also included in the technical scope of the present disclosure as long as not deviating from the technical subject matter.

[First Modification Example]

The above describes a configuration supposing a case where a front end part of a host vehicle has a first-time collision with a bicycle with an occupant which rushes out from a left side relative to the host vehicle. Also in a case where a first-time collision occurs between the host vehicle and a bicycle with an occupant which rushes out from a right side relative to the host vehicle, the second-time collision position may be estimated based on the estimation data (or behavior patterns) according to the mode of the collision, and the external protection device 5 needing to be operated is selected and operated, like in the above embodiment. In addition, the above embodiment is applicable also to a collision between the front end part of the host vehicle and the bicycle with the occupant which approaches from an area diagonally in front of the host vehicle or from an area diagonally behind the host vehicle. Furthermore, it may be applicable to a collision with a bicycle with an occupant which approaches from an area in front of the host vehicle.

[Second Modification Example]

The above describes a configuration in which the second-time collision position estimator section 15 estimates a second-time collision position of each of a head part and a chest part, each of which is adopted as a protection target member. However, there is no need to be limited thereto. The member of the body estimated by the second-time collision position estimator section 15 may be only a head part or a chest part. In addition, a member serving as a protection target member may not need to be limited to a head part or a chest part. A protection target member may be an arm part or a lumbar part. Another configuration may be provided in which the second-time collision position estimator section 15 estimates a second-time collision position such as an arm part or a lumbar part while the operation device selector section 16 selects an operation device based on the estimated result.

[Third Modification Example]

Further, relating to the second modification example, suppose a case where the second-time collision position estimator section 15 estimates the second-time collision position of the head part, but does not estimate the second-time collision position of the chest part. In such a case, the operation device selector section 16 may select an external protection device 5 corresponding to the second-time collision position of the head part, but also the external protection device 5 corresponding to a protection target covering a region within a constant range from a line segment between the first-time collision position and the second-time collision position of the head part.

For example, suppose a case where the first-time collision position corresponds to the left front end part Z2 while the second-time collision position of the head part corresponds to a cowling top. In such a case, not only the WS air bag 5D but also the pop-up hood 5A is selected as an external protection device 5 needing to be operated. This is because there is a high possibility that the chest part collides with a hood portion that is present closer to the first-time collision position than the cowling top, when the head part has the second-time collision with the cowling top.

Such a configuration can operate an external protection device 5 corresponding to the part having a possibility of the second-time collision with the chest part, even if the second-time collision position estimator section 15 does not estimate the second-time collision position of the chest part.

[Fourth Modification Example]

Further, relating to the second modification example, suppose a case where the second-time collision position estimator section 15 estimates the second-time collision position of the chest part, but does not estimate the second-time collision position of the head part. In such a case, the operation device selector section 16 may select not only an external protection device 5 corresponding to the second-time collision position of the chest part, but also an external protection device 5 corresponding to a region within a constant range from a half line going from the first-time collision position towards the second-time collision position of the chest part.

For example, suppose a case where the first-time collision position corresponds to the left front end part Z2 while the second-time collision position of the chest part corresponds to a hood portion. In such a case, not only the pop-up hood 5A but also the WS air bag 5D is selected as an external protection device 5 needing to be operated. It is because the head part of the occupant on the bicycle has a high possibility of having the second-time collision with the cowling top and the windshield which are present rearward of the hood portion in the host vehicle, when the chest part has the second-time collision with the hood portion.

Such a configuration can operate an external protection device 5 corresponding to the part having a possibility of the second-time collision with the head part, even if the second-time collision position estimator section 15 does not estimate the second-time collision position of the head part.

[Fifth Modification Example]

Figure 11:
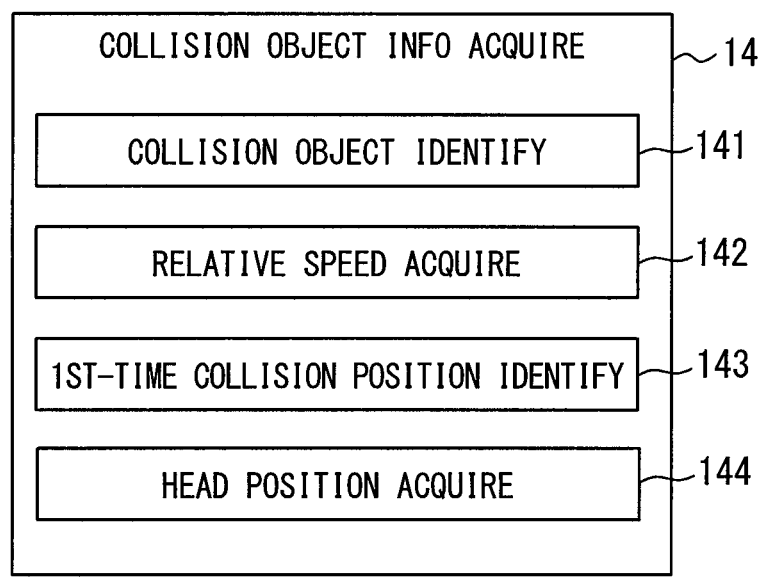
FIG. 11 is a block diagram illustrating an example of a schematic configuration of a collision object information acquirer section in a modification example.

The collision object information acquirer section 14 may include a head position acquirer section 144 (or a head position acquirer 144) in addition to the various functions mentioned above, as indicated in FIG. 11. The head position acquirer section 144 acquires an initial head position that is a relative position of a head part of an occupant on a bicycle relative to the host vehicle when the collision object identifier section 141 determines that the collision object is the bicycle with the occupant. The initial head position may be identified by the image recognizer section 13 applying a known pattern matching process to an image captured by the camera 3.

In such a configuration, the second-time collision position estimator section 15 estimates a head collision position that is a position at which a second-time collision occurs between the host vehicle and the head part of the occupant on the bicycle based on the initial head position acquired by the head position acquirer section 144 and the relative speed acquired by the relative speed acquirer section. The head collision position may be estimated using the data indicating a correspondence relation between the initial head position and the relative speed, which is prepared based on the various experiments. In addition, the head collision position may be estimated based on the head behavior patterns which are modeled from the behaviors of the head part of the occupant after the first-time collision. Further, the head behavior patterns may be represented by a function having parameters such as an initial head position or a relative speed.

The operation device selector section 16 then selects an external protection device S corresponding to the head collision position estimated by the second-time collision position estimator section 15 as an external protection device 5 that is intended to be operated. Even such a configuration can protect an occupant on a bicycle colliding with a host vehicle. Further, the chest part of the occupant on the bicycle may receive a similar process.

[Sixth Modification Example]

In the above configuration, the collision object identifier section 141 determines, among the detection objects which are present in the front detection area, the detection object which is present in the position nearest to the host vehicle at the collision occurrence time when the collision detector section 11 detects the first-time collision (or just before the collision occurrence time) as the collision object. There is no need to be limited thereto.

For example, the collision object information acquirer section 14 may calculate the time to collision (TTC) with respect to each detection object in the detection area from the relative position and relative speed of the detection object; the ITC is the remaining time up to the collision as an index which indicates a danger degree of the collision.

Under such an configuration, the collision object identifier section 141 recognizes a detection object the TIC of which is equal to or less than a predetermined threshold value (for example, 3 seconds), and serves as the smallest value among the TTCs of the detection objects, as an object (defined as a collision object candidate) having a risk of colliding with the host vehicle. Such a collision object candidate being recognized may be then determined as the collision object when the collision detector section 11 detects the first-time collision.

Further, under such a configuration, the relative speed acquirer section 142 may estimate successively the relative speed of the collision object candidate and adopt the relative speed estimated just before the collision detection section 11 detects the first-time collision as a relative speed at the first-time collision time. Similarly, the first-time collision position identifier section 143 may estimate successively the position at which the first-time collision occurs from the relative position and the relative speed of the collision object candidate, and adopt the position estimated just before the collision detection section 11 detects the first-time collision as a first-time collision position.

[Seventh Modification Example]

The above describes an example of a configuration supposing a case where a mobile object having the first-time collision with the host vehicle is a bicycle with an occupant. However, there is no need to be limited thereto. When a mobile object having the first-time collision with a host vehicle is supposed to be a two-wheel mobile object other than a bicycle, such as a motorized bicycle or a motorcycle, the estimation data (or behavior patterns) according to the supposed mobile object may be used, providing a similar effect to the present embodiment.

For example, suppose a case where the protection target is an occupant on a motorcycle. Such a case may execute the various experiments to thereby prepare an estimation data (or behavior patterns) which indicates a correspondence relation between the relative speed and the first-time collision position when the host vehicle has the first-time collision with the motorcycle which the occupant rides.

That is, the above configuration can suppress an operation of the external protection device useless in respect of protecting an occupant on a two-wheel mobile object in a case that the host vehicle has the first-time collision with the two-wheel mobile object.

In addition, a human being who corresponds to a protection target in the above protection device control system 100 does not limit to the occupant on the two-wheel mobile object. If the collision object is a pedestrian, the process for protecting the pedestrian from the second-time collision may be executed. In addition, an occupant on a motor tricycle (called a trike) may be a protection target.

While the present disclosure has been described with reference to embodiments thereof, it is to be understood that the disclosure is not limited to the embodiments and constructions. The present disclosure is intended to cover various modification examples and equivalent arrangements. In addition, the various combinations and configurations, and other combinations and configurations, including more, less or only a single element, are also within the spirit and scope of the present disclosure.

The invention claimed is:

1. A protection control apparatus in a vehicle that is equipped with at least one external protection device to protect an occupant on a two-wheel vehicle, the protection control apparatus comprising:

an object recognizer section configured to acquire information about an object that is present around the vehicle;

a first-time collision detector section configured to detect an occurrence of a first-time collision between the vehicle and a two-wheel mobile object being a two-wheel vehicle on which an occupant is present, based on the information acquired by the object recognizer section;

a relative vector estimator section configured to estimate a relative vector at a first-time collision time based on the information acquired by the object recognizer section, the relative vector indicating a movement speed and a movement direction of the two-wheel mobile object relative to the vehicle, the first-time collision time being a point of time when the first-time collision occurs between the vehicle and the two-wheel mobile object;

a first-time collision position identifier configured to identify a first-time collision position that is a collision position of the two-wheel mobile object relative to the vehicle at the first-time collision time;

a second-time collision position estimator section configured to estimate a second-time collision position that is a position at which the occupant on the two-wheel mobile object has a second-time collision, based on the relative vector estimated by the relative vector estimator section and the first-time collision position identified by the first-time collision position identifier section; and an operation instructor section configured to operate the external protection device, which is determined to be able to protect the occupant on the two-wheel mobile object based on the second-time collision position estimated by the second-time collision position estimator section, wherein:

the relative vector estimator section is configured to estimate, as the relative vector, a relative movement speed of the two-wheel mobile object in a vehicle width direction of the vehicle and a relative movement speed of the two-wheel mobile object in a forth-and-back direction of the vehicle; and the operation instructor section is configured not to operate any of the at least one external protection device in response to (i) the first-time collision position being deviated from a center in a front end part of the vehicle towards a heading direction of the two-wheel mobile object, and, simultaneously, (ii) the relative movement speed of the two-wheel mobile object in the vehicle width direction being equal to or greater than 10 km/h.

2. The protection control apparatus according to claim 1, wherein the operation instruction section is configured not to operate the external protection device in response to that the second-time collision position, which is estimated by the second-time collision position estimator section, is a region having no risk of a second-time collision between the vehicle and the occupant on the two-wheel mobile object.

3. The protection control apparatus according to claim 1, wherein:

the second-time collision position estimator section is configured to estimate a head collision position that is a position at which a second-time collision occurs between the vehicle and a head part of the occupant on the two-wheel mobile object; and the operation instructor section is configured to operate the external protection device corresponding to the head collision position estimated by the second-time collision position estimator section.

4. The protection control apparatus according to claim 3, further comprising:

a head position acquirer section configured to acquire an initial head position that is a position, relative to the vehicle, of a head part of the occupant on the two-wheel mobile object at the first-time collision time that is the point of time when the first-time collision occurs between the vehicle and the two-wheel mobile object, wherein the second-time collision position estimator section is configured to estimate the head collision position based on the initial head position acquired by the head position acquirer section and the relative vector estimated by the relative vector estimator section.

5. The protection control apparatus according to claim 1, further comprising:
an estimation data storage part configured to store an estimation data that indicates a correspondence relation among the relative vector, the first-time collision position, and the second-time collision position of the occupant on the two-wheel mobile object,
wherein
the second-time collision position estimator section is configured to estimate the second-time collision position of the occupant on the two-wheel mobile object based on
(i) the relative vector estimated by the relative vector estimator section,
(ii) the first-time collision position acquired by the first-time collision position identifier section, and
(iii) the estimation data stored in the estimation data storage part.

6. The protection control apparatus according to claim 1, further comprising:
a corresponding region storage part configured to store a data,
wherein:
the vehicle is equipped with a plurality of external protection devices that have mutually different corresponding regions in the vehicle;
the data stored in the corresponding region storage part indicates a correspondence relation between the plurality of external protection devices and respective correspondence regions of the plurality of external protection devices;
the operation instructor section is configured to operate an external protection device among the plurality of external protection devices, the external protection device being determined as corresponding to a region that has a risk of a second-time collision between the vehicle and the occupant on the two-wheel mobile object based on the second-time collision position estimated by the second-time collision position estimator section; and
the operation instructor section is configured not to operate an external protection device among the plurality of external protection devices, the external protection device being determined as corresponding to a region that has no risk of a second-time collision between the vehicle and the occupant on the two-wheel mobile object based on the second-time collision position estimated by the second-time collision position estimator section.

* * * * *